United States Patent
Badger et al.

(10) Patent No.: US 6,715,108 B1
(45) Date of Patent: Mar. 30, 2004

(54) METHOD OF AND SYSTEM FOR MANAGING TEST CASE VERSIONS

(75) Inventors: Brian Badger, Colorado Springs, CO (US); Jonathan Gardner, Wylie, TX (US); Craig Newman, Richardson, TX (US); Eugene E. Williams, Rowlett, TX (US)

(73) Assignee: WorldCom, Inc., Ashburn, VA (US)

( * ) Notice: Subject to any disclaimer, the term of this patent is extended or adjusted under 35 U.S.C. 154(b) by 0 days.

(21) Appl. No.: 09/416,102

(22) Filed: Oct. 12, 1999

(51) Int. Cl.[7] .............................................. H02H 3/05
(52) U.S. Cl. .................................... 714/38; 707/203
(58) Field of Search ........................... 714/38, 37, 39; 717/1, 4, 11; 707/203, 200, 204, 205, 6

(56) References Cited

U.S. PATENT DOCUMENTS

| | | | | |
|---|---|---|---|---|
| 5,379,429 A | * | 1/1995 | Hirasawa et al. | 717/170 |
| 5,437,027 A | * | 7/1995 | Bannon et al. | 707/103 R |
| 5,631,857 A | * | 5/1997 | Kobrosly et al. | 703/23 |
| 5,634,114 A | * | 5/1997 | Shipley | 717/170 |
| 5,732,275 A | * | 3/1998 | Kullick et al. | 717/170 |
| 5,758,156 A | * | 5/1998 | Kano | 713/100 |
| 5,819,082 A | * | 10/1998 | Marion | 707/7 |
| 5,850,554 A | * | 12/1998 | Carver | 717/162 |
| 5,854,889 A | * | 12/1998 | Liese et al. | 714/43 |
| 5,978,940 A | * | 11/1999 | Newman et al. | 714/712 |
| 5,987,633 A | * | 11/1999 | Newman et al. | 714/712 |
| 6,041,330 A | * | 3/2000 | Carman et al. | 707/101 |
| 6,125,371 A | * | 9/2000 | Bohannon et al. | 707/203 |

* cited by examiner

Primary Examiner—Dieu-Minh Le

(57) ABSTRACT

The present invention provides a method of and system for managing test case versions in which each test case version is associated with an application program load version. A set of test case versions is maintained in a test case library or database. Each test case version is identified in the test case library by date order sequence number. A test case version is selected for use with respect to a particular application program version selecting a subset of test case versions from the set of test case versions. The subset includes test case versions, if any, associated with the particular application program version and test case versions associated with application program versions earlier than the particular application program version. The method selects the latest application program version included in the subset of test case versions. The method then selects the latest test case version from the versions for the selected latest application program version.

20 Claims, 5 Drawing Sheets

| VERSION /19 | LOAD /21 | PLATFORM /23 | REVISES /25 | DATE CREATED /27 |
|---|---|---|---|---|
| 11 | 99.1.1 | XYZ | 7 | 5/15/99 |
| 10 | 99.1.3 | ABC | 8 | 5/3/99 |
| 9 | 99.1.3 | XYZ | 7 | 5/1/99 |
| 8 | 99.1.1 | ABC | 5 | 3/1/99 |
| 7 | 99.1.1 | XYZ | 3 | 2/11/99 |
| 6 | 99.1.2 | ABC | 5 | 2/1/99 |
| 5 | 98.4.1 | ABC | 2 | 1/15/99 |
| 4 | 98.4.1 | XYZ | 2 | 10/20/98 |
| 3 | 98.4.2 | XYZ | 2 | 10/15/98 |
| 2 | 98.3.2 | ABC | 1 | 9/16/98 |
| 1 | 98.3.1 | ABC |  | 9/1/98 |

FIG. 4A

| VERSION | LOAD | PLATFORM |
|---|---|---|
| 10 | 99.1.3 | ABC |
| 8 | 99.1.1 | ABC |
| 6 | 99.1.2 | ABC |
| 5 | 98.4.1 | ABC |
| 2 | 98.3.2 | ABC |
| 1 | 98.3.1 | ABC |
| 11 | 99.1.1 | XYZ |
| 9 | 99.1.3 | XYZ |
| 7 | 99.1.1 | XYZ |
| 4 | 98.4.1 | XYZ |
| 2 | 98.4.2 | XYZ |

FIG. 4B

| VERSION | LOAD | PLATFORM |
|---------|--------|----------|
| 9 | 99.1.3 | XYZ |
| 11 | 99.1.1 | XYZ |
| 7 | 99.1.1 | XYZ |
| 2 | 98.4.2 | XYZ |
| 4 | 98.4.1 | XYZ |

FIG. 4C

METHOD OF AND SYSTEM FOR MANAGING TEST CASE VERSIONS

FIELD OF THE INVENTION

The present invention relates to the field of software version management, and more to particularly to a method and system for managing test case versions, particularly in a telecommunications system test environment.

DESCRIPTION OF THE PRIOR ART

An important phase of the development of software and hardware systems is testing. In telecommunications systems, whenever new equipment is added to a network or new feature is implemented in a network, the telecommunications service provider must run tests to see how the new equipment or feature operates in the network and how the new equipment or feature works with other equipment and how features affect the performance of the network as a whole. System testing is typically implemented through test cases written by test engineers. Test cases include scripts that cause test equipment, such as bulk call generators, to simulate actual network conditions.

In telecommunications systems, equipment, such as switches, is operated by software application programs. New services and features, and improvements to existing features, are implemented through new versions of the applications programs, which are known in the art as loads. Whenever a new feature or improvement is added, a new version or load must be developed.

Telecommunications networks tend to be heterogeneous. A network typically includes different models of equipment made by a particular manufacturer, or equipment made by different manufacturers, all performing the same function in the network. For example, a network usually includes many different model switches. Each model switch is operated by software specifically adapted to the switch. While the software for each switch causes the same or similar function, the actual code is likely to be different.

Many products are derivatives of, or follow on releases to, other products. Test cases used for testing earlier products often provide useful base test cases for the development of test cases for later products. Often, a test case version developed for one application program load is completely valid for testing a later load. Similarly, the test case version developed to test an application program load on one hardware platform is often valid for testing a similar load a different platform. However, in some instances, it is necessary to modify a test case version written for an earlier load in order to test properly a later load.

In a typical test environment, several different software loads are under test at any one time by several different test engineers. In a dynamic and rapidly changing environment, test engineers need substantially free access to test cases for use in the testing of equipment and services and the development of new test cases. However, it is necessary to preserve earlier, properly functioning, test case versions as new test case versions are created. It is also necessary to provide a mechanism by which test engineers can simultaneously correct test cases that are not functioning properly and protect the test cases that work from inadvertent corruption by other test engineers.

SUMMARY OF THE INVENTION

The present invention provides a method of and system for managing test case versions, and is particularly adapted for managing test case versions in a telecommunication system test environment. Each test case version is associated with an application program load version. A test case version may be associated with a hardware platform type as well as an application program load version. A set of test case versions is maintained in a test case library or database. Each test case version is identified in the test case library by date order sequence number.

The present invention provides a method of selecting a test case version from the set of test case versions to use with respect to a particular application program load version. The method selects a subset of test case versions from the set of test case versions. The subset includes test case versions, if any, associated with the particular application program load version and test case versions associated with application program load versions earlier than the particular application program load version. The method selects the latest application program load version included in the subset of test case versions. The method then selects the latest test case version from the versions for the selected latest application program load version.

The user may use the selected test case to test the particular application program load version or as a template to create a new test case version for the particular application program load version. The user creates a new test case version by editing the selected test case version and testing the edited test case version. The user continues the editing and testing process until the user is satisfied that the new version works as intended. When the user is satisfied, the user commits the edited test case version to the test case database and the system assigns the new version the next sequential version number. If the user is not satisfied, the user aborts the test case without adding a new version to the test case database. The present invention thus allows multiple users to work with test case versions and create new versions without locking down the test case database or implementing a check-out/check-in system.

BRIEF DESCRIPTION OF THE DRAWINGS

FIG. 4A illustrates a test case version table according to the present invention.

FIG. 4B illustrates the table of FIG. 4A sorted by platform type according to the present invention.

FIG. 4C illustrates the table of FIG. 4B sorted by application program load version date according to the present invention.

DESCRIPTION OF THE PREFERRED EMBODIMENT

Figure 1:
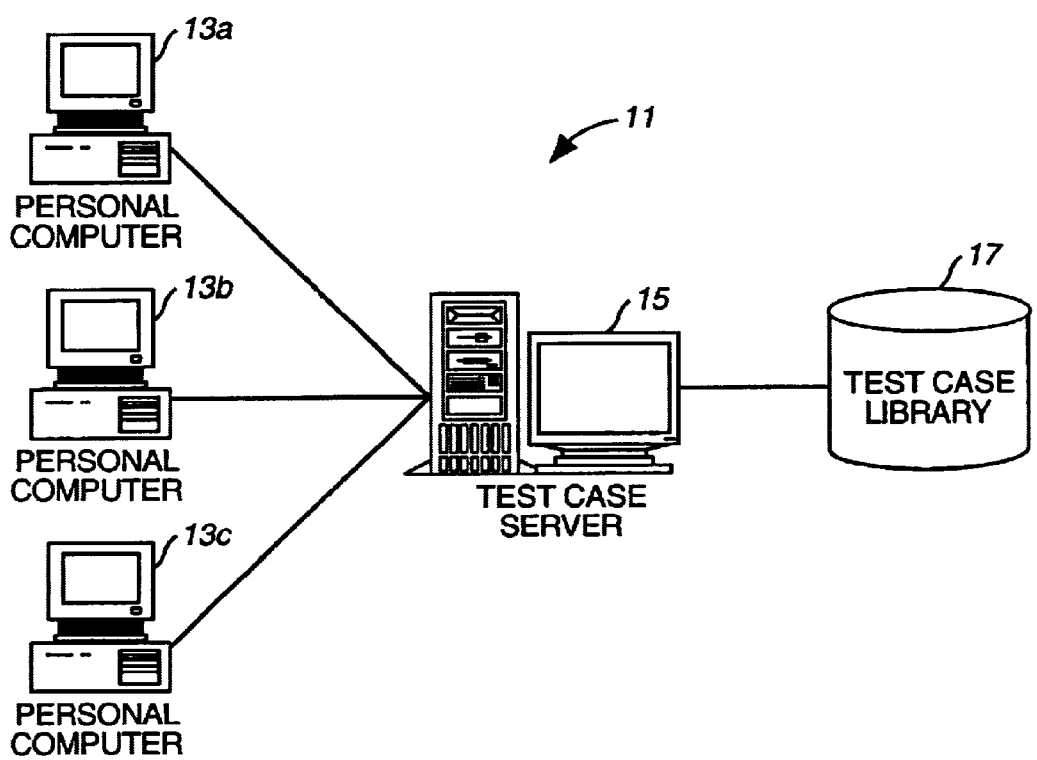
FIG. 1 is a block diagram of a system according to the present invention.

Referring now to the drawings, and first to FIG. 1, the system according to the present invention is designated generally by the numeral 11. In the preferred embodiment, system 11 is implemented in a client/server environment. System 11 includes a plurality of client machines, such as personal computers 13, and a test case server 15 in a network such as a local area network (LAN). Test case server 15 manages a test case library or database 17. Test case library 17 contains test cases that may be used in actual testing of equipment and services or in the development of new test case versions. Client machines 13 provide a user interface by which users or test engineers can use test cases.

Referring briefly to FIG. 4A, each test case version of a set of test cases is identified by a version number shown in column 19 of the table of FIG. 4A. As will be explained in detail hereinafter, version numbers are assigned sequentially in date order as versions are committed to the database. Each version is associated with an application program load version shown in column 21. Each load version is identified by a version name. For purposes of illustration, the tables of FIG. 4, load version names are expressed numerically in year (YY), quarter (Q), release (R) format. Thus, load version 98.3.1 was the first release in the third quarter of 1998. Accordingly, load version 98.3.2 is later than load version 98.3.1. However, load versions may also be named according to alternative naming schemes, such as LOAD 1.0, LOAD 1.1, LOAD 2.1, LOAD 2.2, etc., or given arbitrary version names, such as RED, PINK, GREEN, BLUE, etc. The preferred embodiment of the present invention includes a table (not shown) that maps load name to a load ranking. The load ranking identifies chronological order of each load version.

Referring still to FIG. 4A, a test case version may also be associated with a hardware platform type, indicated in column 23, as well as the load version indicated in column 21. For example, test case version 1 is associated with a hardware platform identified as ABC and version 3 is associated with a platform identified as XYZ. The table of FIG. 4A also contains a version history set out in a ※ revises※ column 25 and a ※ date created ※ column 27. Column 25 indicates which earlier version provided the template for a later version. For example, test case version 2 is a revision of version 1, and versions 3–5 are revisions of version 2. The version table may also include the identity of the user that created a particular version.

Figure 2:
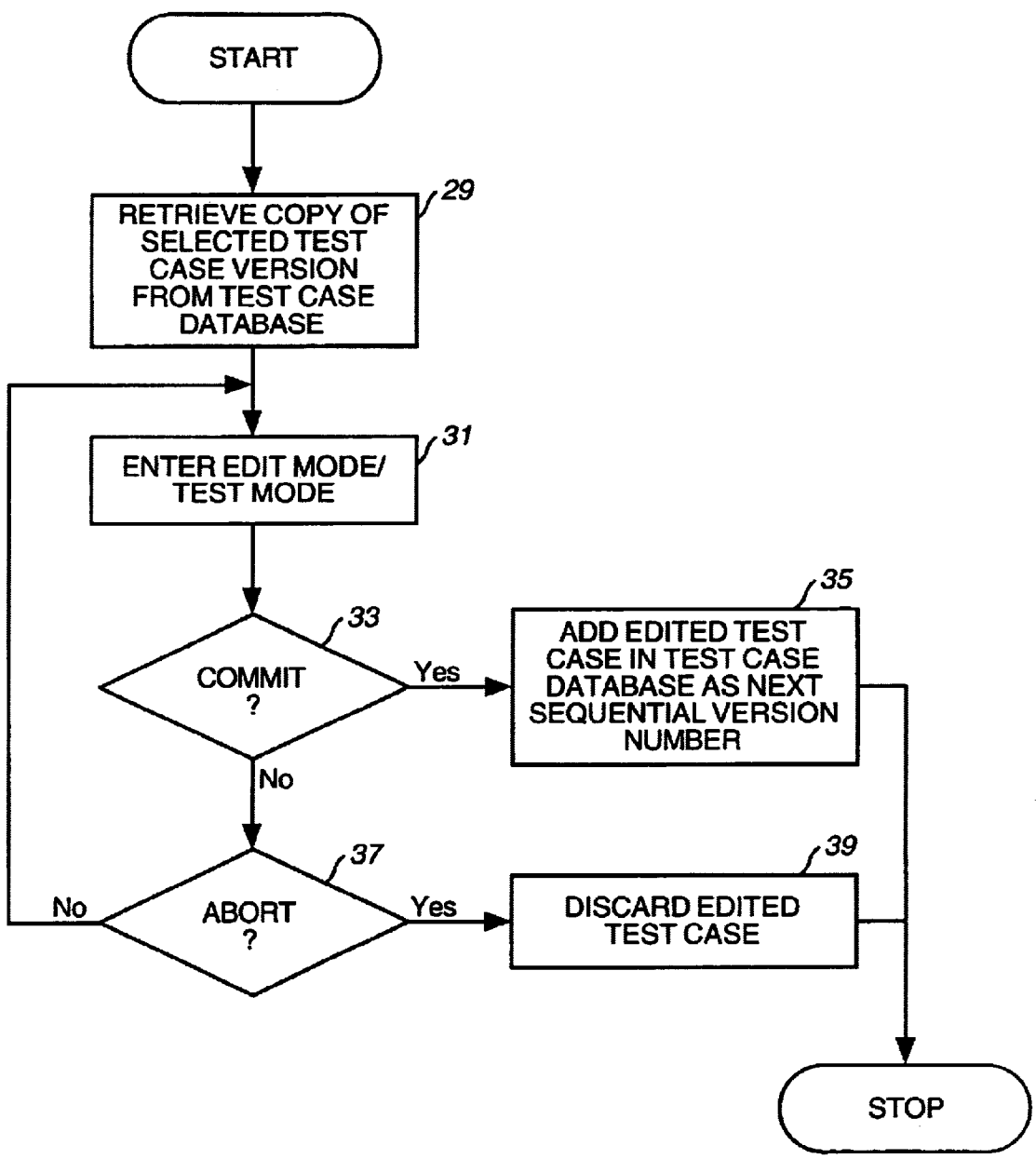
FIG. 2 is a flowchart of test case editing and database management according to the present invention.

Referring now to FIG. 2, there is shown a high level flowchart of test case version management processing according to the present invention. In the preferred embodiment, certain steps of FIG. 2 are preformed on the server and other steps are performed on the client. At block 29, the server retrieves a copy of a user selected test case version and downloads the copy to the requesting client. Version selection according to the present invention will be discussed in detail with respect to FIG. 3. The present invention does not use a check-out/check-in or lockdown mechanism with respect to test case versions that have been downloaded to a user. Rather, each test case version in the library or database is always available. Thus, two or more user may be working with the same test case version at the same time.

After the selected test case version has been downloaded to the client, at block 29, the client enters an edit and test mode, indicated generally at block 31. The test case may be edited with any suitable text editor. As the user edits the test case, the user may test the test case to see if the test case works as intended. During the course of editing and testing, the user may save the test case locally. At the conclusion of editing or testing, the user may either commit the test case to the database or abort the test case. If, at decision block 33, the user commits the test case, the client uploads the edited test case back to the server, and the server adds the edited test case to the database as the next sequential test case version number, as indicated at block 35, along with the other information set forth in the table of FIG. 4A. If, at decision block 37, the user aborts the edited test case, the test case is deleted from client memory without uploading the test case to the server, as indicated at block 39.

Each test case committed to the database is thus saved as a new version. As will be apparent, there may be multiple test case versions for the same load version and platform. However, as new versions are added to the database, earlier versions are preserved.

A user can select a test case version for use by simply specifying a particular version. For example, a user may wish to modify a test case that the user has previously created. A user may also select a test case by inspecting the table of FIG. 4A. However, in a larger organization, with multiple versions for multiple load versions and platforms, it may not be apparent which test case version will provide the best, or in some cases suitable, template for the creation of a new version. For example, since multiple load version may be under test at the same time, a test case version associated with a later load version may be created before the creation of a test case version associated with an earlier load version. In most cases, a test case version for a later load version is not an appropriate template for creating a test case for an earlier load version.

Figure 3:
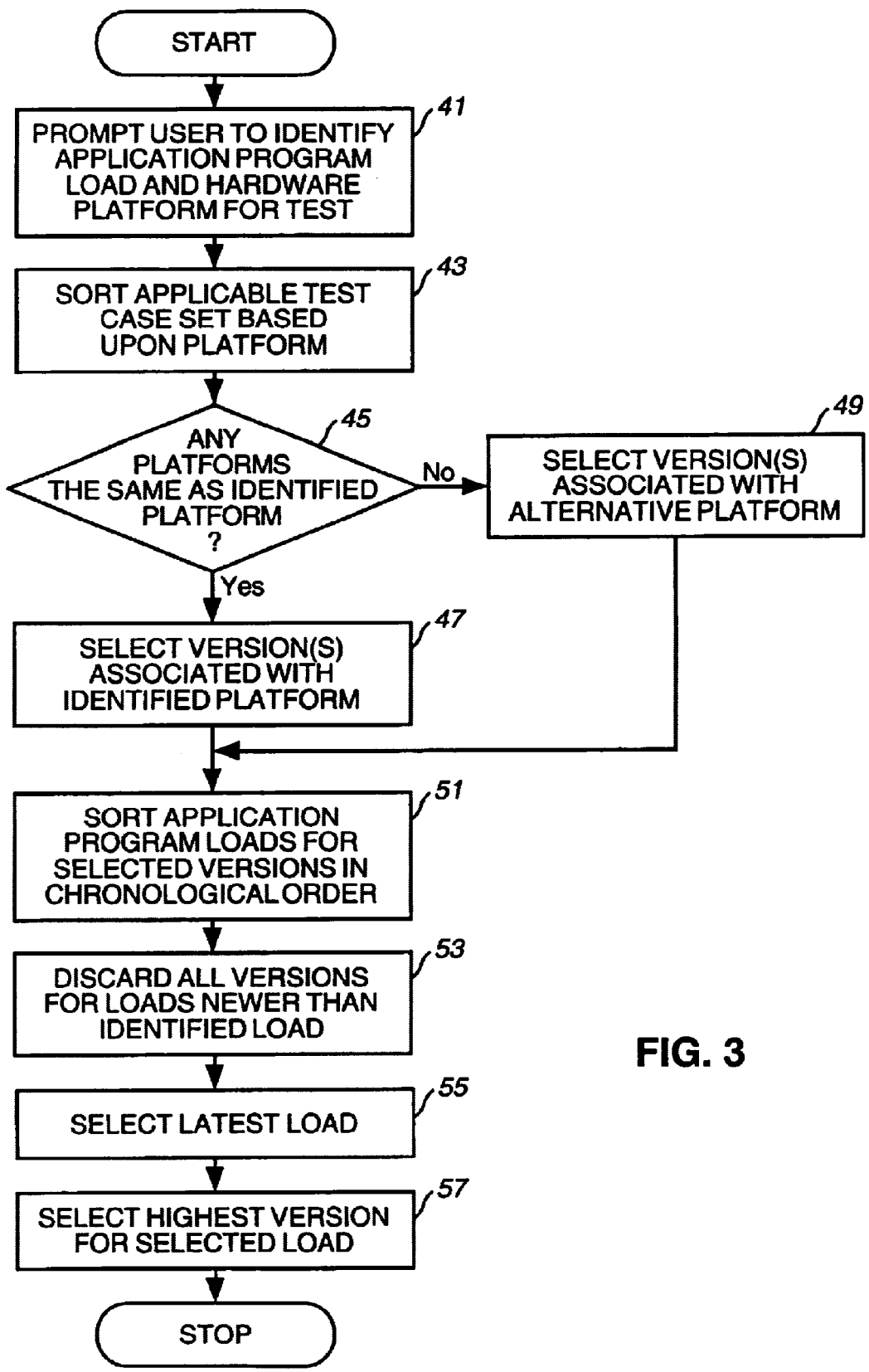
FIG. 3 is a flowchart of test case version selection according to the present invention.

The present invention provides an automated method of selecting a test case version for use with respect to a particular platform. According to the present invention, the server selects the latest version of the test case that is associated with the latest load version that is the same as or earlier than the particular load version the user is testing. Referring to FIG. 3, the client machine prompts the user to identify a particular application program load version and hardware platform, at block 41. FIG. 3 processing may be performed on either the client or the server. The system sorts the applicable test case set based upon platform type, at block 43. The system then tests, at decision block 45, if any platforms are the same as the identified platform. If so, the system selects the sorted version or versions associated with the identified platform, at block 47. If not, the system selects the version or versions associated with an alternative platform, at block 49.

After the system has selected a subset of test case versions based upon platform type, the system sorts the selected subset based upon load version, in chronological order, at block 51. The system then discards all test case versions associated with loads newer than the identified load version, at block 53. The system then selects the latest load version, at block 55. If there is more than one test case version associated with the load version selected at block 55, the system selects the highest version number, at block 57. The test case version selected at block 57 is the best candidate for use with respect to the particular load version and platform.

Version selection according to the present invention is illustrated with respect to FIGS. 4A–4C. Assume that the user wishes to test load version 99.1.2 for platform XYZ. In FIG. 4B, the test case versions of FIG. 4A are shown sorted according to platform type. The test case version associated with platform XYZ are version numbers 2, 4, 7, 9, and 11. In FIG. 4C, the test case versions of FIG. 4B are shown sorted according to load version. Since the user wishes to test load version 99.1.2, the system of the present invention discards test case version 9, which is associated with later (newer) load version 99.1.3. The latest remaining load version is load 99.1.1, which is associated with test case versions 7 and 11. According the selection method of the present invention, the system selects test case version 11.

From the foregoing, it may be seen that the present invention provides an effective system for managing test cases. The system allows multiple users simultaneous access to test case versions, while preserving the integrity of the test cases in the test case library. The system provides an automated method by which a user can select a best test case version to use with respect to a particular application program load version and platform.

The present invention has been illustrated and described with respect to a presently preferred embodiment. Those skilled in the art will recognize alternative embodiments, given the benefit of the foregoing description. Certain features of the invention may be used independently of, or in combination with, other features. Accordingly, the foregoing description is for purposes of illustration and not of limitation.

What is claimed is:

1. A method of managing test case versions, which comprises the computer implemented steps of:

maintaining a test case database, said test case database including a set of test case versions, each of said test case versions being associated with an application program version;

assigning a date order sequence version number to each test case version in said test case database; and in response to a user request for a test case version for use with respect to a particular application version, selecting a best candidate test case version from said test case database, the selecting step including, selecting a subset of test case versions from said test case database, said subset including test case versions associated with said particular application program version and application program versions earlier than said particular application program version, selecting the latest application program version included in said subset of test case versions, and, selecting the latest test case version from the versions for said selected latest application program version.

2. The method as claimed in claim 1, wherein said step of selecting said subset includes the computer implemented steps of:

sorting the test case versions in said test case database in application program version date order; and, discarding all test case versions associated with application program versions later than said particular application program.

3. The method as claimed in claim 2, wherein said step of selecting the latest test case version from the versions for said selected latest application program version includes the computer implemented step of:

sorting the test case versions for said selected latest application program version in test case version number order.

4. The method as claimed in claim 1, including the computer implemented step of:

providing a copy of said best candidate test case version to said user.

5. The method as claimed in claim 4, including the computer implemented step of:

in response to user committing a copy of a test case version to said database, storing said committed copy in said database as the next sequential test case version.

6. A system for managing test case versions, which comprises:

a test case database, said test case database including a set of test case versions, each of said test case versions being associated with an application program version, wherein each test case version in said test case database is assigned a date order sequence version number; and means, responsive to a user request for a test case version for use with respect to a particular application version, for selecting a best candidate test case version from said test case database, said means for selecting including, means for selecting a subset of test case versions from said test case database, said subset including test case versions associated with said particular application program version and application program versions earlier than said particular application program version, means for selecting the latest application program version included in said subset of test case versions, and, means for selecting the latest test case version from the versions for said selected latest application program version.

7. The system as claimed in claim 6, wherein said means for selecting said subset includes:

means for sorting the test case versions in said test case database in application program version date order; and, means for discarding all test case versions associated with application program versions later than said particular application program.

8. The system as claimed in claim 7, wherein said means for selecting the latest test case version from the versions for said selected latest application program version includes:

means for sorting the test case versions for said selected latest application program version in test case version number order.

9. The system as claimed in claim 6, including:

means for providing a copy of said best candidate test case version to said user.

10. The system as claimed in claim 9, including:

means, responsive to user committing a copy of a test case version to said database, for storing said committed copy in said database as the next sequential test case version.

11. A method of managing test cases, comprising:

receiving a request for a test case, said request indicating a particular version of an application program;

selecting a plurality of test cases from a database of test cases based on the indicated version of the application program, each of the test cases being associated with an application program version and a test case version;

selecting a test case from the selected test cases based on the associated test case version, wherein the selected test cases include test case versions associated with the particular application program version and application program versions earlier than the particular application program version, and the latest application program version and the latest test case version are selected from the selected test cases; and providing the selected test case in response to the request.

12. The method as claimed in claim 11, wherein said selecting the plurality of test cases includes:

discarding test cases associated with application program versions later than the indicated version of the application program.

13. The method as claimed in claim 11, further comprising:

running the selected test case against the application program.

14. The method as claimed in claim 11, further comprising:

modifying the selected test case for use with respect to the application program.

15. A method of managing test cases, comprising:

receiving a request for a test case, said request indicating a platform and a version of an application program;

determining if there is at least one test case that is associated with the platform of the application program;

if there is not at least one test case that is associated with the platform of the application program, then:

selecting a plurality of test cases from a database of test cases based on the indicated version of the application program, each of the test cases being associated with an alternative hardware platform, an application program version, and a test case version; and selecting a test case from the selected test cases based on the associated test case version; and providing the selected test case in response to the request.

16. The method as claimed in claim 15, wherein said selecting the plurality of test cases includes selecting test cases from the database that are associated with application program versions that are the same or earlier than the indicated version of the application program.

17. The method as claimed in claim 16, wherein said selecting the plurality of test cases includes:

discarding test cases associated with application program versions later than the indicated version of the application program.

18. The method as claimed in claim 15, wherein said selecting the test case from the selected test cases based on the associated test case version includes selecting a test case having the latest test case version.

19. The method as claimed in claim 15, further comprising:

running the selected test case against the application program.

20. The method as claimed in claim 15, further comprising:

modifying the selected test case for use with respect to the application program.

* * * * *